United States Patent
Jing et al.

(10) Patent No.: US 11,218,911 B2
(45) Date of Patent: Jan. 4, 2022

(54) METHOD, APPARATUS AND DEVICE FOR DISTRIBUTING FLOW ON 4G NETWORK

(71) Applicant: Hangzhou DPtech Technologies Co., Ltd., Zhejiang Province (CN)

(72) Inventors: Junping Jing, Zhejiang (CN); Yanhua Li, Zhejiang (CN)

(73) Assignee: Hangzhou DPtech Technologies Co., Ltd., Zhejiang Province (CN)

( * ) Notice: Subject to any disclaimer, the term of this patent is extended or adjusted under 35 U.S.C. 154(b) by 13 days.

(21) Appl. No.: 16/906,284

(22) Filed: Jun. 19, 2020

(65) Prior Publication Data
US 2020/0404542 A1   Dec. 24, 2020

(30) Foreign Application Priority Data
Jun. 20, 2019   (CN) .......................... 201910537662.5

(51) Int. Cl.
*H04W 28/10*   (2009.01)
*H04W 76/11*   (2018.01)

(52) U.S. Cl.
CPC ............ *H04W 28/10* (2013.01); *H04W 76/11* (2018.02)

(58) Field of Classification Search
CPC ................ H04W 28/10; H04W 28/08; H04W 28/0289; H04W 28/12; H04W 76/10; H04W 76/11; H04W 76/12; H04W 24/02; H04W 88/14; H04L 47/125
See application file for complete search history.

(56) References Cited

U.S. PATENT DOCUMENTS

| | | | | |
|---|---|---|---|---|
| 2003/0016666 A1* | 1/2003 | Okamoto | ................ | H04L 45/24 370/389 |
| 2013/0022043 A1* | 1/2013 | Lee | ..................... | H04L 63/0428 370/389 |
| 2013/0272127 A1* | 10/2013 | Ali | ........................ | H04W 76/12 370/235 |
| 2015/0245249 A1* | 8/2015 | Grootwassink | ..... | H04L 67/1095 370/328 |
| 2019/0261167 A1* | 8/2019 | Zhang | ................. | H04L 63/0869 |
| 2019/0373506 A1* | 12/2019 | Harari | ................... | H04L 47/125 |

OTHER PUBLICATIONS

3rd Generation Partnership Project,Technical Specification Group Core Network and Terminals,3GPP Evolved Packet System (EPS), Evolved General Packet Radio Service (GPRS),Tunnelling Protocol for Control plane (GTPv2-C), Stage 3; 3GPP TS 29.274 V16.3.0 (Mar. 2020), 392 pages.

* cited by examiner

*Primary Examiner* — Ricardo H Castaneyra
(74) *Attorney, Agent, or Firm* — Greenblum & Bernstein, P.L.C.

(57) ABSTRACT

The present disclosure provides a method of distributing flow on a 4G network, which is applied to a distribution device. The method includes: monitoring a GTPv2 signalling packet communicated between a mobile management entity (MME) and a serving gateway (SGW); obtaining a data plane tunnel identifier and a user phone number, which are carried in the monitored GTPv2 signalling packet and indicate a same user equipment (UE), and establishing association relationship between the data plane tunnel identifier and the user phone number; obtaining a target data plane tunnel identifier carried in a received data packet; and determining a target user phone number associated with the target data plane tunnel identifier based on the association relationship, and distributing the data packet based on the target user phone number.

14 Claims, 4 Drawing Sheets

METHOD, APPARATUS AND DEVICE FOR DISTRIBUTING FLOW ON 4G NETWORK

CROSS REFERENCE TO RELATED APPLICATIONS

The present application claims priority to Chinese Patent Application No. 201910537662.5 entitled "METHOD, APPARATUS AND DEVICE FOR DISTRIBUTING FLOW ON 4G NETWORK" filed on Jun. 20, 2019, the disclosure of which is incorporated herein by reference in its entirety.

TECHNICAL FIELD

The present application relates to computer technologies, and in particular, to a method, an apparatus, and a device for distributing flow on a 4G network.

BACKGROUND

In a 4G (4th Generation) network, a user equipment (UE) supporting a 4G network communicates data packets with an external network. A UE and an eNB (Evolved Node B, i.e., an evolved base station) form an access network, an MME (Mobility Management Entity), an SGW (Service Gateway), a PGW (Packet Data Network (PDN) Gateway), an HSS (Home Contracted Subscriber Server), and the like form a core network.

Before performing data access to the external network, the UE needs to be attached to the 4G network first. After the UE is successfully attached to a 4G network, a control plane tunnel and a data plane tunnel (user plane tunnel) will be established in the 4G network. The control plane tunnel is formed between the MME and the SGW and is used for communicating of signalling packets. The data plane tunnel is formed between the eNB and the SGW and is used to forward user data packets. The data plane tunnel includes a default bearer data plane tunnel and a dedicated bearer data plane tunnel. The default bearer data plane tunnel is used for forwarding basic user data packets, and the dedicated bearer data plane tunnel is used for forwarding user-specific data packets In many cases, the above user data packet needs to be analysed, so it is important to distribute the user data packet in an appropriate method.

SUMMARY

The present application provides a method of distributing flow on a 4G network, which is applied to a distribution device. The method includes: monitoring a GTPv2 signalling packet communicated between an MME and an SGW; obtaining a data plane tunnel identifier and a user phone number, which are carried in the monitored GTPv2 signalling packet and indicate a same user equipment (UE), and establishing association relationship between the data plane tunnel identifier and the user phone number; obtaining a target data plane tunnel identifier carried in a received data packet; and determining a target user phone number associated with the target data plane tunnel identifier based on the association relationship, and distributing the data packet based on the target user phone number.

The present application also provides a distribution device for flow on a 4G network. The distribution device includes: a processor; and a memory storing a computer program that can be executed by the processor to implement the above method of distributing flow on a 4G network.

DETAILED DESCRIPTION

Figure 1:
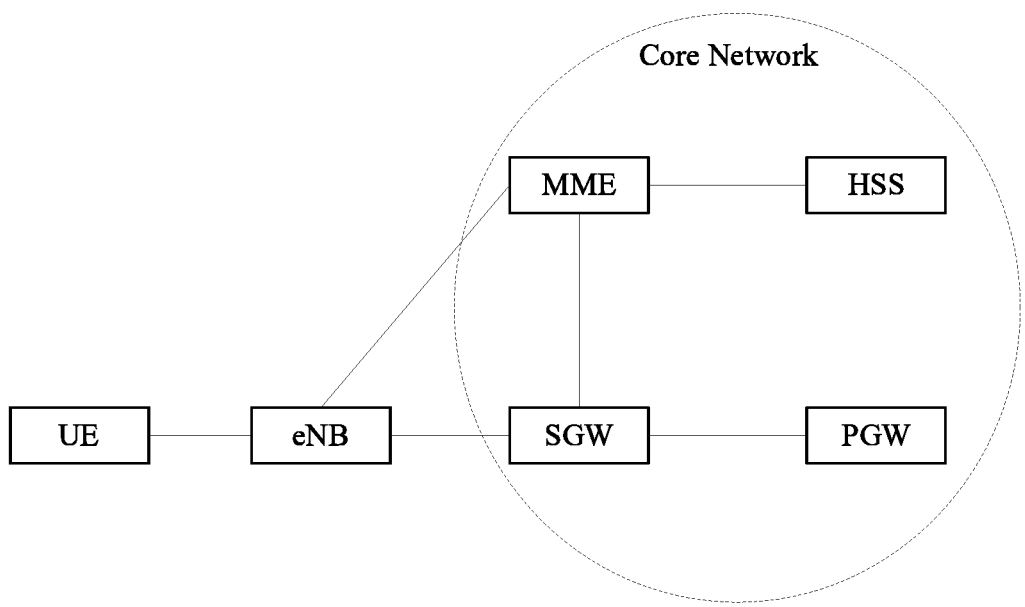
FIG. 1 illustrates a 4G network topology.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

The terms used in the present application are for the purpose of describing particular examples only, and are not intended to limit the present application. Terms determined by "a", "the" and "said" in their singular forms in the present application and the appended claims are also intended to include plurality, unless clearly indicated otherwise in the context. It should also be understood that the term "and/or" as used herein includes any of one or more associated listed items and all possible combinations thereof.

It is to be understood that, although terms "first," "second," "third," and the like may be used in the present application to describe various information, such information should not be limited to these terms. These terms are only used to distinguish one category of information from another. For example, without departing from the scope of the present application, first information may be referred as second information; and similarly, second information may also be referred as first information. Depending on the context, the word "if" as used herein may be interpreted as "when" or "upon" or "in response to determining".

The following are the definitions of terms used in the present specification.

GTPv2: GTP version 2, control plane. GPRS (General Packet Radio Service) tunnel transmission protocol, applied to an S11 interface (interface between an MME and an SGW) and an S5/S8 interface (interface between an SGW and a PGW) of the core network, and is control protocol flow of the core network, which mainly for implementing establishment, usage, management and release of the control plane tunnel.

MME: Mobility Management Entity. MME is the only control plane device in the core network. Its main functions are access control, mobility management, session management, network element selection, and storage of user information.

SGW: Serving GateWay. The network element SGW is located on the user plane. Its main functions are user management, routing and data forwarding, QoS (Quality of Service) control, billing, and storage of information.

PGW: PDN (packet data network) GateWay. The network element PGW is also located in the user plane and belongs to the border gateway of the core network. PGW provides user session management and bearer control, data forwarding, and IP (Internet Protocol) address allocation and non-3GPP (3rd Generation Partnership Project) user access and other functions.

HSS: Home Subscriber Server, used to store a database of subscriber subscription information.

eNB: Evolved Node B, an evolved base station.

UE: User Equipment. The unique identity of the user equipment is IMSI (International Mobile Subscriber Identity).

FIG. 1 illustrates a 4G network topology, in which a UE and an eNB form an access network, and an MME, an SGW, a PGW, an HSS, etc. form a core network.

In the related art, a user data packet of the data plane tunnel between the eNB and the SGW is monitored, and triple or quintuple information of the monitored data packet is used to realize the distributing of the data packet. Since the IP address of the user equipment is randomly allocated by the core network, when the user equipment is reattached to the core network, the IP address may change. Therefore, only from the triple or quintuple information of the user data packet, it cannot be determined which user equipment the user data packet belongs to. That is to say, with the distributing method of the related art, it cannot realize distributing user data packets sent by various user equipment based on respective user equipment.

In view of above, examples of the present application provide a method of distributing flow on a 4G network, which is applied to a distribution device. By establishing association relationship between a data plane tunnel identifier and a user phone number in the distribution device, the user phone number is associated with the user data packet carrying the data plane tunnel identifier, so as to realize distributing of the user data packets by the user equipment (i.e., by the user phone number).

Figure 2:
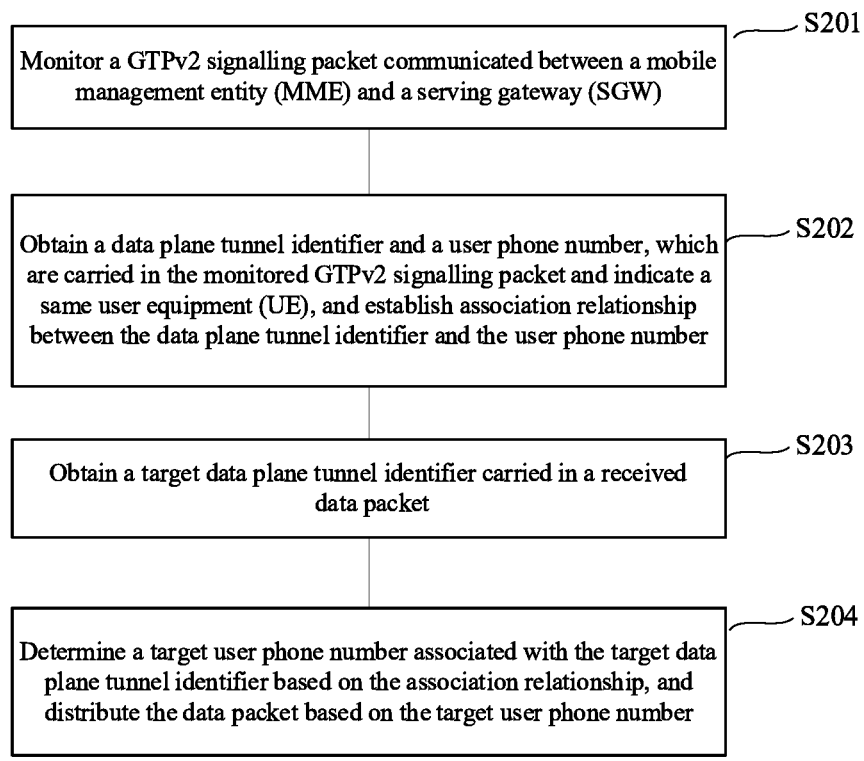
FIG. 2 is a flowchart of a method of distributing flow on a 4G network according to examples of the present application.

FIG. 2 is a flowchart of a method of distributing flow on a 4G network according to examples of the present application. The method includes steps S201-S204.

At step S201, a GTPv2 signalling packet communicated between a mobile management entity (MME) and a serving gateway (SGW) is monitored.

At step S202, a data plane tunnel identifier and a user phone number, which are carried in the monitored GTPv2 signalling packet and indicate a same UE, are obtained, and association relationship between the data plane tunnel identifier and the user phone number is established.

At step S203, a target data plane tunnel identifier carried in a received data packet is obtained.

At step S204, a target user phone number associated with the target data plane tunnel identifier is determined based on the association relationship, and the data packet is distributed based on the target user phone number.

In the above example, the distribution device obtains the user phone number and the data plane tunnel identifier which indicate the same user equipment by monitoring the GTPv2 signalling packet communicated between the MME and the SGW, and establishes the association relationship between the user phone number and the data plane tunnel identifier, so that the distribution device can determine the target user phone number associated with the target data plane tunnel identifier carried in the user data packet based on the association relationship. In this way, the user phone number is associated with the user data packet, and it can realize distributing the user data packet based on the user phone number.

When the distribution device receives user data packets sent from various user equipment, the distribution device can distinguish user data packets sent by respective user equipment based on respective phone numbers associated with each target data plane tunnel identifier carried in these user data packets. It can further realize distributing the user data packets sent by different user equipment based on the user phone numbers.

Figure 3:
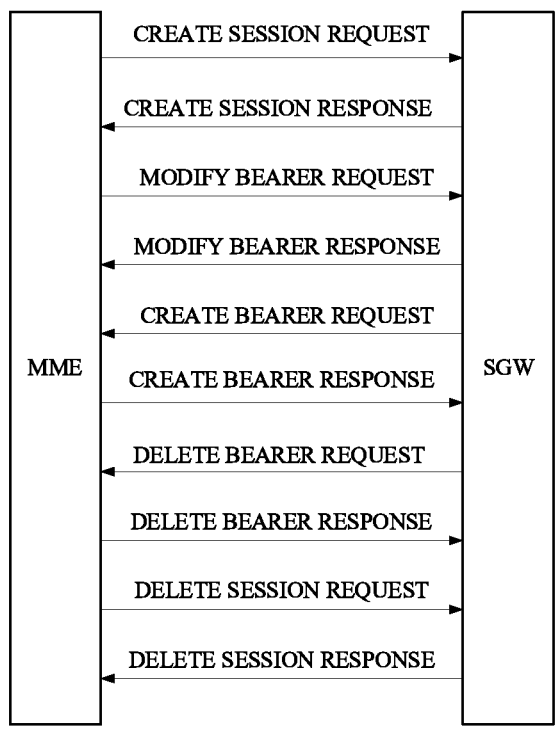
FIG. 3 is a schematic diagram of GTPv2 protocol signalling packets communicated between an MME and an SGW according to examples of the present application.

In some examples of the present application, the GTPv2 protocol signalling packets communicated between the MME and the SGW can be classified into four types of packets: a create session signalling packet, a create-modify bearer signalling packet, a delete bearer signalling packet and a delete session signalling packet. FIG. 3 is a schematic diagram of a GTPv2 protocol signalling packet communicated between an MME and an SGW according to examples of the present application.

As shown in FIG. 3, the create session signalling packet includes a CREATE SESSION REQUEST signalling packet and a CREATE SESSION RESPONSE signalling packet. The create-modify bearer signalling packet includes a MODIFY BEARER REQUEST signalling packet, a MODIFY BEARER RESPONSE signalling packet, a CREATE BEARER REQUEST signalling packet and a CREATE BEARER RESPONSE signalling packet. The delete bearer signalling packet includes a DELETE BEARER REQUEST signalling packet and a DELETE BEARER RESPONSE signalling packet. The delete session signalling packet includes a DELETE SESSION REQUEST signalling packet and a DELETE SESSION RESPONSE signalling packet.

The create session signalling packet carries the user phone number of the user equipment and a control plane tunnel identifier allocated to the user equipment. The create-modify bearer signalling packet, the delete bearer signalling packet, and the delete session signalling packet each carry a data plane tunnel identifier allocated to the user equipment and a control plane tunnel identifier used for matching.

Figure 4:
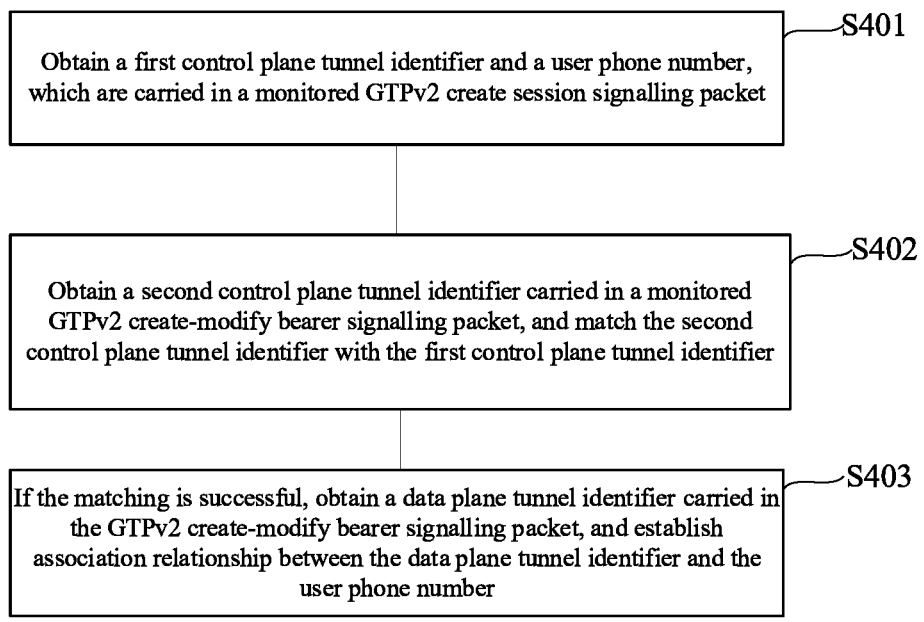
FIG. 4 is a flowchart of a method of establishing association relationship between a user phone number and a data plane tunnel identifier according to examples of the present application.

FIG. 4 is a flowchart of a method of establishing association relationship between a user phone number and a data plane tunnel identifier which indicate a same UE according to examples of the present application. The method includes steps S401-S403.

At step S401, a first control plane tunnel identifier and a user phone number, which are carried in a monitored GTPv2 create session signalling packet, are obtained.

At this step, the control plane tunnel identifier includes an MME end control plane tunnel identifier allocated by the MME to the user equipment and an SGW end control plane tunnel identifier allocated by the SGW to the user equipment. When the MME and the SGW send signalling packets to each other, they will carry the control plane tunnel identifier of the counterpart device, so that the counterpart device can identify the user equipment related to the signalling packet based on the control plane tunnel identifier when receiving the signalling packet from the local end device. For example, when the SGW sends a different type of signalling packet to the MME, the signalling packet carrying the MME end control plane tunnel identifier allocated to the user equipment, so that the MME end can identifies the user equipment related to the signalling packet based on the MME end control plane tunnel identifier when receiving the signalling packet.

At step S402, a second control plane tunnel identifier carried in a monitored GTPv2 create-modify bearer signalling packet is obtained, and the second control plane tunnel identifier is matched with the first control plane tunnel identifier.

At step S403, if the matching is successful, a data plane tunnel identifier carried in the GTPv2 create-modify bearer signalling packet is obtained, and association relationship between the data plane tunnel identifier and the user phone number is established.

In the above steps, in order to ensure that the obtained data plane tunnel identifier is related to the user equipment, when the GTPv2 create-modify bearer signalling packet is monitored, the second control plane tunnel identifier carried in the create-modify bearer signalling packet is first matched with a control plane tunnel identifier stored locally (for example, stored in the distribution device). If the matching is successful, it indicates that the create-modify bearer signalling packet is related to the UE. Then, the data plane tunnel identifier allocated to the UE and carried in the create-modify bearer signalling packet is obtained, and association relationship between the data plane tunnel identifier and the user phone number is established. Thereby, it can ensure that the user phone number and the data plane tunnel identifier indicate the same UE.

It should be noted that the distribution device stores the above information (including the user phone number, the data plane tunnel identifier and the control plane tunnel identifier) in many ways. For example, the above information is stored in one integral table in the distribution device as shown in Table 1, or the above information is separately stored in the distribution device in a storage manner that can reflect the association relationship of the pieces of information.

TABLE 1

| Control Plane Tunnel Identifier | Default Bearer Data Plane Tunnel Identifier | Dedicated bearer data Plane Tunnel Identifier | User Phone Number |
|---|---|---|---|
| A | C | E | 130xxxxxxx |

In some examples of the present application, one way for storing the above information in the distribution device is implemented.

For example, two storage nodes with associated relationships are created in the distribution device. One of the two storage nodes, when matching the signalling packet, does not distinguish the flow direction of the packet, but stores the control plane tunnel identifier, and the other of the two storage nodes stores the user phone number and the data plane tunnel identifier, and establishes association relationship between the user phone number and the data plane tunnel identifier in the other storage node. Of course, there are many ways to create two associated storage nodes. For example, two storage nodes store the same user phone number or the same control plane tunnel identifier.

In some examples of the present application, the other way for storing the above information in the distribution device is implemented.

For example, three storage nodes with associated relationships are created in the distribution device. The first storage node stores the MME end control plane tunnel identifier, which is used to be matched with the signalling packet sent by the SGW to the MME; the second storage node stores the SGW end control plane tunnel identifier, which is used to be matched with the signalling packet sent by the MME to the SGW; and the third storage node stores the association relationship between the user phone number and the data plane tunnel identifier.

In some examples of the present application, a method of distributing a user data packet with a distribution device is provided.

Figure 5A:
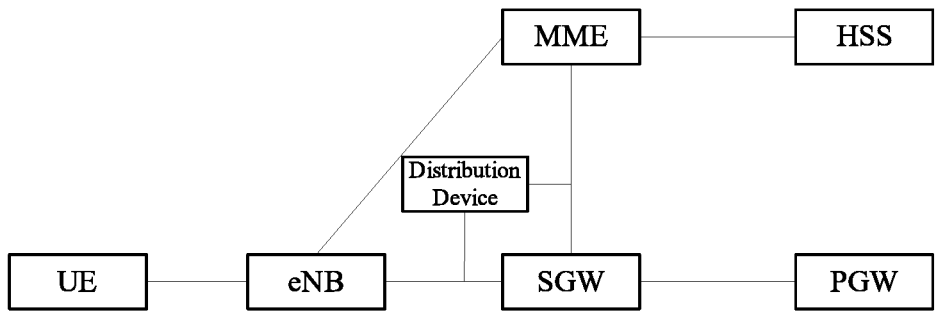
FIG. 5a illustrates a topology of distributing a user data packet with a distribution device according to examples of the present application.

FIG. 5a is a topology diagram of distributing a user data packet with a distribution device according to examples of the present application.

As shown in FIG. 5a, the distribution device can monitor the signalling packet communicated between the MME and the SGW, and can also obtain the user data packet communicated between the eNB and the SGW. In addition, the distribution device has two associated storage nodes, hereinafter referred to as a first storage node and a second storage node. The first storage node, when matching the signalling packet, does not distinguish the flow direction of the signalling packet, and stores the correspondence between the control plane tunnel identifier and the user phone number, and the second storage node stores the association relationship between the user phone number and the data plane tunnel identifier.

It should be noted that there are many ways for the distribution device to monitor packets. For example, when the packet is sent from a local device to a counterpart device, it can be copied to the distribution device, or the distribution device only monitors the packet sent or received by the SGW device. The following is an example of copying a packet to a distribution device when the packet is sent from one device to the other device.

In order to access to the external network, the UE has to be attached to the 4G network first. Therefore, the UE will initiate an attach request to the MME through the eNB. The attach request carries the user phone number of the UE.

After receiving the attach request, the MME will allocate the MME end control plane tunnel identifier and the MME end data plane tunnel identifier to the UE, and send information such as the MME end control plane tunnel identifier and the user phone number to the SGW through a CREATE SESSION REQUEST signalling packet, and the information is copied to the distribution device.

Figure 5B:
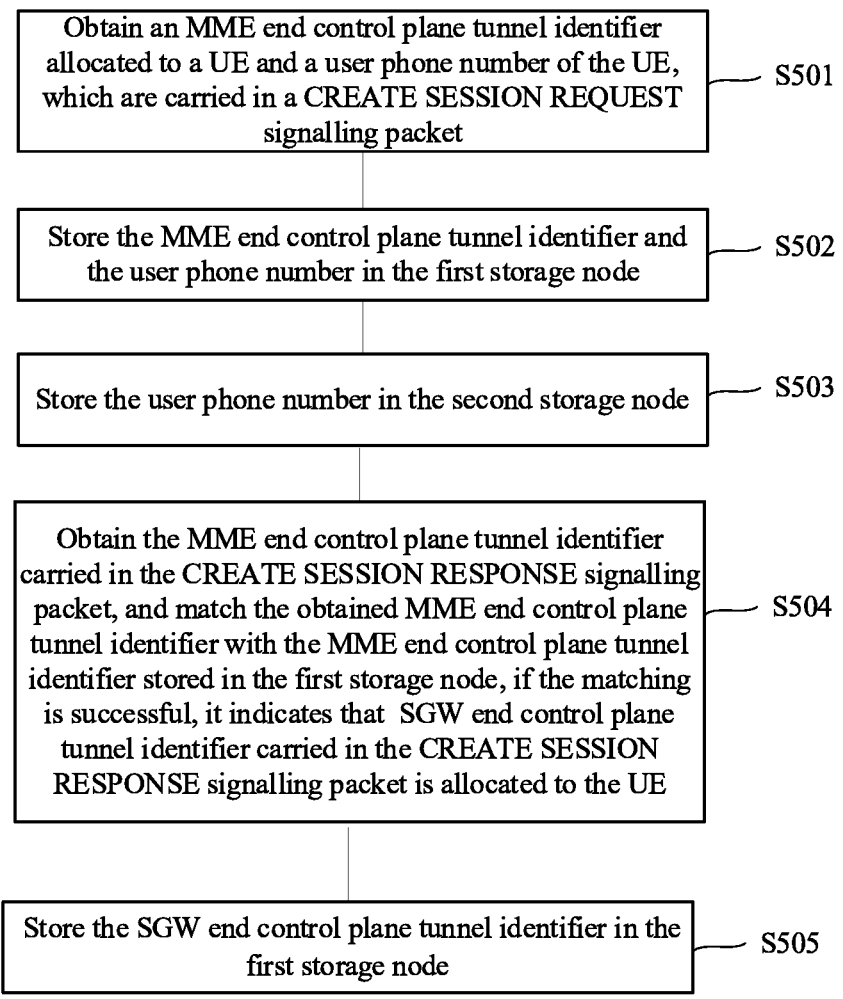
FIG. 5b is a flowchart of a method of distributing a user data packet with a distribution device according to examples of the present application.

After the distribution device receives the CREATE SESSION REQUEST signalling packet, the distribution device can perform a method of distributing the user data packet. As shown in FIG. 5b, the method can include steps S501-S505.

At step S501, an MME end control plane tunnel identifier allocated to a UE and a user phone number of the UE, which are carried in a CREATE SESSION REQUEST signalling packet, are obtained. At step S502, the MME end control plane tunnel identifier and the user phone number are stored in the first storage node. At step S503, the user phone number is stored in the second storage node.

After receiving the CREATE SESSION REQUEST signalling packet, the SGW will allocate an SGW end control plane tunnel identifier to the UE and notify the PGW of the request for the UE to attach to the network. In response to the notification, the PGW allocates information such as IP address, billing policy, and routing selection to the UE, and returns the information to the SGW. The SGW returns the SGW end control plane tunnel identifier, the received MME end control plane tunnel identifier, and the information allocated by the PGW to the MME through a CREATE SESSION RESPONSE signalling packet and copies the same to the distribution device.

After receiving the CREATE SESSION RESPONSE signalling packet, at step S504, the distribution device obtains the MME end control plane tunnel identifier carried in the CREATE SESSION RESPONSE signalling packet, and matches the obtained MME end control plane tunnel identifier with the MME end control plane tunnel identifier stored in the first storage node. If the matching is successful, it indicates that the SGW end control plane tunnel identifier carried in the CREATE SESSION RESPONSE signalling packet is allocated to the UE. Then, at step S505, the SGW end control plane tunnel identifier is stored in the first storage node. It should be noted here that since the IP address allocated by the core network to the UE is variable, in order to facilitate retrieve the Internet IP address of the UE based on the user phone number, the IP address in the CREATE SESSION RESPONSE signalling packet can also be stored in the second storage node.

So far, the first storage node of the distribution device stores the correspondence between the control plane tunnel identifier (including the SGW end control plane tunnel identifier and the MME end control plane tunnel identifier) allocated to the UE and the user phone number. Since each of the create-modify bearer signalling packet, the delete bearer signalling packet, and the delete session signalling packet in the GTPv2 protocol signalling packet carries the data plane tunnel identifier and the control plane tunnel identifier allocated to the UE, it is only necessary to match the control plane tunnel identifier carried in the various types of signalling packets with the control plane tunnel identifier stored in the first storage node. If the matching is successful, It should be noted that the association relationship of different UEs can be stored in a same storage node, or can be stored in separate storage nodes. Similarly, the control plane tunnel identifiers allocated to different UEs can be stored in the same storage node, or can be stored in separate storage nodes.

The following is a detailed description with reference to the step of the distribution device creating the association relationship between the data plane tunnel identifier and the user phone number.

For example, a first UE and a second UE request to attach to the 4G network, where the user phone number of the first UE is 13000000000, and the core network allocates, to the first UE, an MME end control plane tunnel identifier "A1", an SGW end control plane tunnel identifier "B1", a default bearer MME end data plane tunnel identifier "C1", a default bearer SGW end data plane tunnel identifier "D1", a dedicated bearer MME end data plane tunnel identifier "E1", and a dedicated bearer SGW end data plane tunnel identifier "F1".

The user phone number of the second UE is 13011111111, and the core network allocates, to the second UE, an MME end control plane tunnel identifier "A2", an SGW end control plane tunnel identifier "B2", a default bearer MME end data plane tunnel identifier "C2", a default bearer SGW end data plane tunnel identifier "D2", a dedicated bearer MME end data plane tunnel identifier "E2", and a dedicated bearer SGW end data plane tunnel identifier "F2".

After the distribution device performs steps S501-S505, the storage content in the first storage node can be as shown in Table 2, and the storage content in the second storage node can be as shown in Table 3.

TABLE 2

| MME End Control Plane Tunnel Identifier | SGW End Control Plane Tunnel Identifier | User Phone Number |
| --- | --- | --- |
| A1 | B1 | 13000000000 |
| A2 | B2 | 13011111111 |

TABLE 3

| Default Bearer MME End Data Plane Tunnel Identifier | Default Bearer SGW End Data Plane Tunnel Identifier | Dedicated bearer MME End Data Plane Tunnel Identifier | Dedicated bearer SGW End Data Plane Tunnel Identifier | User Phone Number |
| --- | --- | --- | --- | --- |
|  |  |  |  | 13000000000 |
|  |  |  |  | 13011111111 | it can mean that the data plane tunnel identifier carried in the signalling packet is allocated to the UE, and then the data plane tunnel identifier can be stored in the second storage node. In this way, the second storage node will store the data plane tunnel identifier (including the default bearer data plane tunnel identifier and the dedicated bearer data plane tunnel identifier) and the user phone number which indicate the same UE. The association relationship between the data plane tunnel identifier and the user phone number can be established within the second storage node.

Similarly, when different UEs request to attach to a 4G network, the association relationship between the data plane tunnel identifier allocated to respective UEs and the user phone number in the distribution device can be established through the above steps.

When the distribution device receives the CREATE BEARER REQUEST signalling packet related to the second UE sent by the SGW to the MME, the MME end control plane tunnel identifier A2 carried in the CREATE BEARER REQUEST signalling packet is matched with the MME end control plane tunnel identifier stored in the second storage node. If the matching is successful, the user phone number corresponding to A2 can be retrieved as 13011111111, and the dedicated bearer SGW end data plane tunnel identifier F2 carried in the CREATE BEARER REQUEST signalling packet is stored to the "dedicated bearer SGW end data plane tunnel identifier" item corresponding to the phone number 13011111111 in the second storage node. The content stored in the second storage node can be as shown in Table 4.

TABLE 4

| Default Bearer MME End Data Plane Tunnel Identifier | Default Bearer SGW End Data Plane Tunnel Identifier | Dedicated Bearer MME End Data Plane Tunnel Identifier | Dedicated Bearer SGW End Data Plane Tunnel Identifier | User Phone Number |
|---|---|---|---|---|
| | | | F2 | 13000000000<br>13011111111 |

Similarly, after the distribution device completes the step of creating the association relationship between the data plane tunnel identifier and the user phone number for the first UE and the second UE, the content stored in the second storage node can be as shown in Table 5.

TABLE 5

| Default Bearer MME End Data Plane Tunnel Identifier | Default Bearer SGW End Data Plane Tunnel Identifier | Dedicated Bearer MME End Data Plane Tunnel Identifier | Dedicated Bearer SGW End Data Plane Tunnel Identifier | User Phone Number |
|---|---|---|---|---|
| C1 | D1 | E1 | F1 | 13000000000 |
| C2 | D2 | E2 | F2 | 13011111111 |

Through the above steps, the second storage node of the distribution device maintains the association relationship between the data plane tunnel identifiers and the user phone numbers for respective UEs.

In some examples of the present application, the distribution device has multiple egress ports. The distribution device maintains the correspondence between a plurality of preset user phone numbers and the plurality of egress ports, respectively. The distribution device forwards user data packets corresponding to different user phone numbers from different egress ports.

After receiving the user data packet communicated between the eNB and the SGW, the distribution device first obtains the target data plane tunnel identifier carried in the user data packet; then, based on association relationship between the data plane tunnel identifiers and user phone numbers maintained in distribution device, a user phone number associated with the target data plane tunnel identifier is determined, and an egress port is determined based on the user phone number labelled in the user data packet, from which the user data packet is forwarded.

Figure 6:
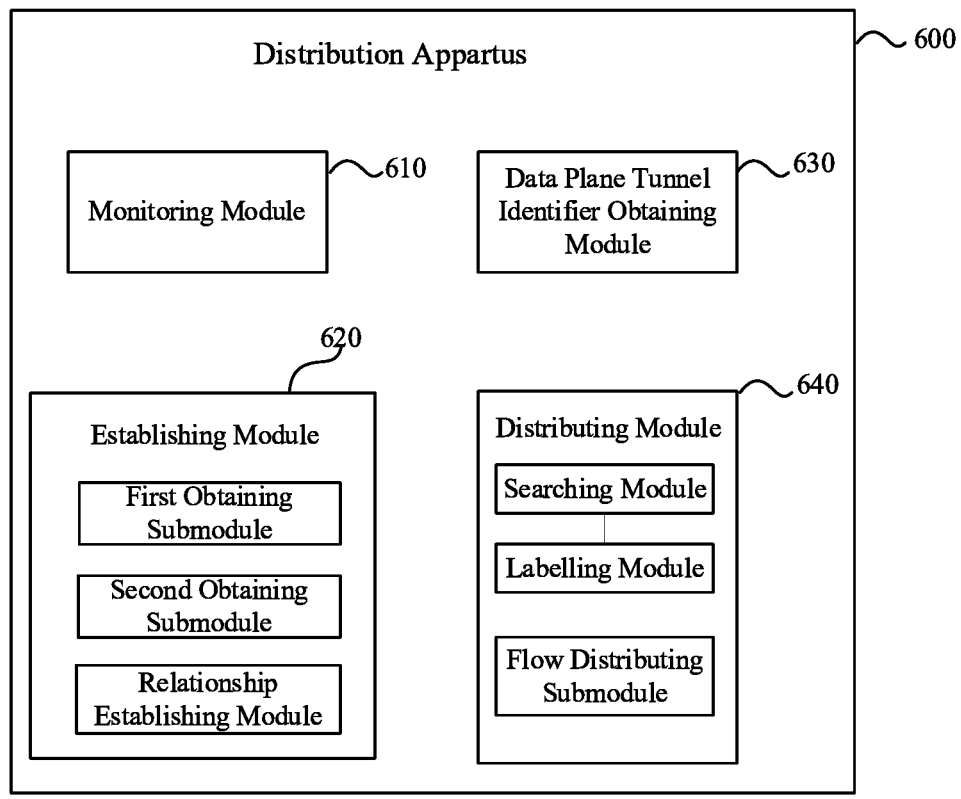
FIG. 6 is a block diagram of an apparatus for distributing flow on a 4G network according to examples of the present application.

Corresponding to the above method examples, the present application further provides an apparatus for distributing flow on a 4G network, which is applied to a distribution device. FIG. 6 is a block diagram of an apparatus 600 for distributing flow on a 4G network according to examples of the present application. The apparatus 600 can include a monitoring module 610, an establishing module 620, a data plane tunnel identifier obtaining module 630, and a flow distributing module 640.

The monitoring module 610 is configured to monitor a GTPv2 signalling packet communicated between an MME and an SGW. The establishing module 620 is configured to obtain a data plane tunnel identifier and a user phone number, which are carried in the monitored GTPv2 signalling packet and indicate a same UE, and establish association relationship between the data plane tunnel identifier and the user phone number. The data plane tunnel identifier obtaining module 630 is configured to obtain a target data plane tunnel identifier carried in a received data packet. The flow distributing module 640 is configured to determine a target user phone number associated with the target data plane tunnel identifier based on the association relationship, and distribute the data packet based on the target user phone number.

In one implementation, the establishing module 620 can include: a first obtaining submodule configured to obtain a first control plane tunnel identifier and a user phone number, which are carried in a monitored GTPv2 create session signalling packet; a second obtaining submodule configured to obtain a second control plane tunnel identifier carried in a monitored GTPv2 create-modify bearer signalling packet, and match the second control plane tunnel identifier with the first control plane tunnel identifier carried in a monitored GTPv2 create session signalling packet; a relationship establishing module configured to if the matching is successful, obtain a data plane tunnel identifier carried in a GTPv2 create-modify bearer signalling packet, and establish association relationship between the data plane tunnel identifier and the user phone number.

In some implementations, the distribution device includes a first storage node, and a second storage node associated with the first storage node. The relationship establishing module is further configured to: store the control plane tunnel identifier carried in the monitored GTPv2 create session signalling packet to the first storage node; store the data plane tunnel identifier and the user phone number to the second storage node; establish association relationship between the obtained data plane tunnel identifier and the user phone number in the second storage node.

In some implementations, the first storage node and the second storage node store the same user phone number or the same control plane tunnel identifier.

In some implementations, the relationship establishing module is further configured to: if the GTPv2 create session signalling packet is a CREATE SESSION REQUEST signalling packet sent by the MME to the SGW, obtain a first MME end control plane tunnel identifier and the user phone number, which are carried in the CREATE SESSION REQUEST signalling packet, and store the first MME end control plane tunnel identifier to the first storage node; if the GTPv2 create session signalling packet is a CREATE SESSION RESPONSE signalling packet sent by the SGW to the MME, obtain a second MME end control plane tunnel identifier carried in the CREATE SESSION RESPONSE signalling packet, and match the second MME end control plane tunnel identifier and the first MME end control plane tunnel identifier stored in the first storage node; if the matching is successful, obtain an SGW end control plane tunnel identifier carried in the CREATE SESSION RESPONSE signalling packet, and store the SGW end control plane tunnel identifier in the first storage node.

In some implementations, the relationship establishing module is further configured to: store the user phone number to a second storage node; if the GTPv2 create-modify bearer signalling packet is a MODIFY BEARER REQUEST signalling packet, a MODIFY BEARER REQUEST signalling packet, a CREATE BEARER REQUEST signalling packet or a CREATE BEARER RESPONSE signalling packet communicated between the MME and the SGW, obtain a control plane tunnel identifier carried in the GTPv2 create-modify bearer signalling packet, and match the obtained control plane tunnel identifier with the control plane tunnel identifier stored in the first storage node; if the matching is successful, obtain a data plane tunnel identifier carried in the GTPv2 create-modify bearer signalling packet, and store the data plane tunnel identifier to the second storage node.

In some implementations, the relationship establishing module is further configured to: if the matching is successful, obtain an IP address information carried in the CREATE SESSION RESPONSE signalling packet, and store the IP address information in the second storage node.

In some implementations, the flow distributing module 640 further includes: a searching module configured to determine a target user phone number associated with the target data plane tunnel identifier based on the association relationship; a labelling module configured to label the target user phone number in the data packet; a flow distributing submodule configured to distribute the data packet based on the target user phone number labelled in the data packet.

In some implementations, the distribution device includes a plurality of egress ports, and the distribution device maintains the correspondence between a plurality of preset user phone number and the plurality of egress port, respectively. The flow distributing submodule includes: a determination module configured to determine, based on the correspondence, one of the plurality of egress ports corresponding to the target user phone number labelled in the data packet; and a forwarding module configured to forward the data packet via the determined egress port.

The example of the distributing apparatus of the present application can be applied to a distribution device. The apparatus examples can be implemented by software, or by hardware or a combination of hardware and software. Taking software implementation as an example, as a logical apparatus, it is formed by reading corresponding computer program instructions in the non-volatile memory into the memory and executing the computer program instructions through the processor of the distribution device where it is located.

Figure 7:
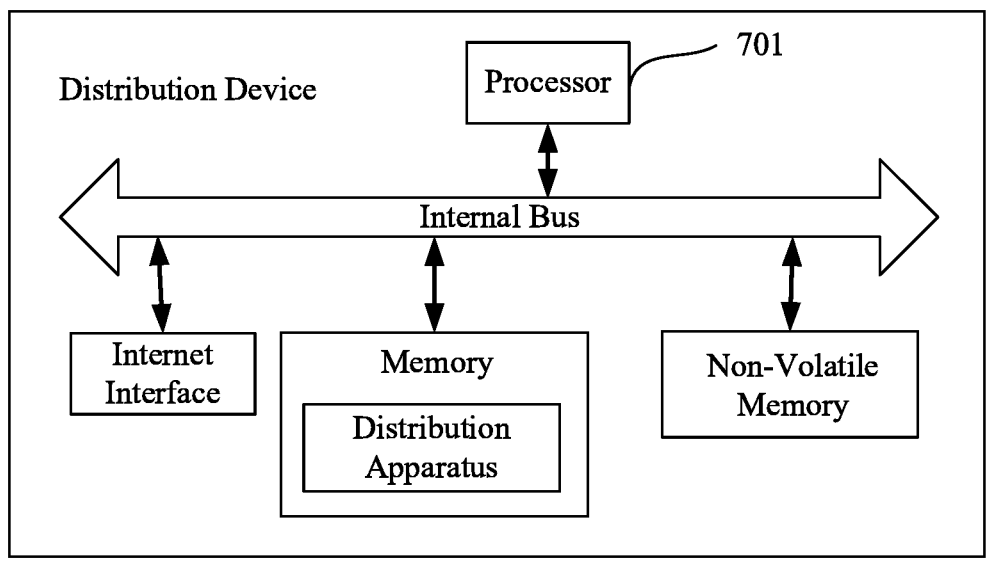
FIG. 7 is a block diagram of a device for distributing flow on a 4G network according to examples of the present application.

FIG. 7 is a block diagram of a device for distributing flow on a 4G network according to examples of the present application. The distribution device can include: a memory, a processor 701, and a computer program stored on the memory and executable on the processor, where the processor 701 implements the following operations when executing the program: monitoring a GTPv2 signalling packet communicated between an MME and an SGW; obtaining a data plane tunnel identifier and a user phone number, which are carried in the monitored GTPv2 signalling packet and indicate a same UE, and establishing association relationship between the data plane tunnel identifier and the user phone number; obtaining a target data plane tunnel identifier carried in a received data packet; and determine a target user phone number associated with the target data plane tunnel identifier based on the association relationship, and distribute the data packet based on the target user phone number.

For the implementation process of the functions and effects of the units in the above apparatus, reference can be made to the implementation process of corresponding steps in the above method for details, which will not be repeated here.

Since the apparatus examples substantially correspond to the method examples, a reference can be made to part of the descriptions of the method examples for the related part. The apparatus examples described above are merely illustrative, where the units described as separate members can be or not be physically separated, and the members displayed as units can be or not be physical units, i.e., can be located in one place, or can be distributed to a plurality of network units. Part or all of the modules can be selected based on actual requirements to implement the objectives of the solutions in the application. Those of ordinary skill in the art can understand and carry out them without creative work.

Examples of the subject matter and functional operations described in this specification can be implemented in one or a combination of: a digital electronic circuit, tangibly embodied computer software or firmware, computer hardware including the structures disclosed in this specification and their structural equivalents. Examples of the subject matter described in this specification can be implemented as one or more computer programs, that is, one or more modules of computer program instructions encoded on a tangible non-transitory program carrier to be executed by or control a data processing apparatus. Alternatively or additionally, program instructions can be encoded on an artificially generated propagation signal, such as a machine-generated electrical, optical, or electromagnetic signal, which is generated to encode and transmit the information to a suitable receiver apparatus and to be executed by the processing apparatus. The computer storage medium can be a machine-readable storage device, a machine-readable storage substrate, a random or serial access memory device, or a combination of one or more of them.

The processes and logic flows described in this specification can be performed by one or more programmable computers that execute one or more computer programs to perform corresponding functions by operating according to input data and generating output. The processing and logic flow can also be performed by a dedicated logic circuit, such as an FPGA (field programmable gate array) or an ASIC (application specific integrated circuit), and the apparatus can also be implemented as a dedicated logic circuit.

Computers suitable for executing computer programs include, for example, general-purpose and/or special-purpose microprocessors, or any other type of central processing units. Generally, the central processing unit will receive instructions and data from a read-only memory and/or a random access memory. The basic components of a computer include a central processing unit for implementing or executing instructions and one or more memory devices for storing instructions and data. Generally, the computer will also include one or more mass storage devices for storing data, such as magnetic disks, magneto-optical disks, or optical disks, or the computer will be operably coupled to the mass storage device from/to which data is received or transmitted, or both. However, the computer does not have to have such a device. In addition, the computer can be embedded in another device, such as a mobile phone, a personal digital assistant (PDA), a mobile audio or a video player, a game console, a global positioning system (GPS) receiver, or, for example, a portable storage device of a universal serial bus (USB) flash drive, to name a few.

Computer-readable media suitable for storing computer program instructions and data include all forms of non-volatile memories, media, and memory devices, including, for example, semiconductor memory devices (such as EPROMs, EEPROMs, and flash memory devices), magnetic disks (such as internal hard disks or removable disks), magneto-optical disks and CD ROMs and DVD-ROM disks. The processor and the memory can be supplemented by, or incorporated in, dedicated logic circuits.

Although this specification contains many specific implementation details, these should not be construed as limiting the scope of any disclosure or the scope of protection as claimed, but are mainly used to describe features of specific examples of a particular disclosure. Certain features described in multiple examples within this specification can also be implemented in combination in a single example. On the other hand, various features described in a single example can also be implemented separately in multiple examples or in any suitable sub-combination. Furthermore, although features can function in certain combinations as described above and even initially claimed as such, in some cases one or more features from the claimed combination can be removed from the combination and required protected combinations can point to sub-combinations or variations of sub-combinations.

Similarly, although the operations are depicted in a specific order in the drawings, this should not be construed as requiring these operations to be performed in the specific order shown or sequentially, or requiring all illustrated operations to be performed to achieve the desired result. In some cases, multitasking and parallel processing can be advantageous. In addition, the separation of various system modules and components in the above examples should not be understood as requiring such separation in all examples, and it should be understood that the described program components and systems can generally be integrated together in a single software product medium, or packaged into multiple software products.

The above are only some examples of the present disclosure, and are not intended to limit the present application. Any modifications, equivalent replacements, improvements, etc. made within the spirit and principles of the present application should be included in the scope of the present application.

What is claimed is:

1. A method of distributing flow on a 4G network, which is applied to a distribution device, the method comprises:
    monitoring a GTPv2 signalling packet communicated between a mobile management entity (MME) and a serving gateway (SGW);
    obtaining a data plane tunnel identifier and a user phone number, which are carried in the monitored GTPv2 signalling packet and indicate a same user equipment (UE), and establishing association relationship between the data plane tunnel identifier and the user phone number;
    obtaining a target data plane tunnel identifier carried in a received data packet; and
    determining a target user phone number associated with the target data plane tunnel identifier based on the association relationship, and distributing the data packet based on the target user phone number;
    wherein:
    the obtaining of the data plane tunnel identifier and the user phone number and the establishing of the association relationship comprise:
        obtaining a first control plane tunnel identifier and the user phone number, which are carried in a monitored GTPv2 create session signalling packet;
        obtaining a second control plane tunnel identifier carried in a monitored GTPv2 create-modify bearer signalling packet;
        matching the second control plane tunnel identifier with the first control plane tunnel identifier; and
        in response to determining that the matching is successful, obtaining the data plane tunnel identifier carried in the GTPv2 create-modify bearer signalling packet, and establishing the association relationship between the data plane tunnel identifier and the user phone number;
    the distribution device comprises a first storage node and a second storage node associated with the first storage node;
    the obtaining of the first control plane tunnel identifier and the user phone number comprises: storing the first control plane tunnel identifier in the first storage node;
    the obtaining of the data plane tunnel identifier carried in the GTPv2 create-modify bearer signalling packet comprises: storing the data plane tunnel identifier and the user phone number in the second storage node; and
    the establishing of the association relationship between the data plane tunnel identifier and the user phone number comprises: establishing the association relationship between the data plane tunnel identifier and the user phone number in the second storage node.

2. The method according to claim 1, wherein the first storage node and the second storage node store a same user phone number or a same control plane tunnel identifier.

3. The method according to claim 1, wherein the storing of the first control plane tunnel identifier in the first storage node comprises one of:
    in response to determining that the GTPv2 create session signalling packet is a CREATE SESSION REQUEST signalling packet sent by the MME to the SGW, obtaining a first MME end control plane tunnel identifier and the user phone number, which are carried in the CREATE SESSION REQUEST signalling packet, and storing the first MME end control plane tunnel identifier to the first storage node; and
    in response to determining that the GTPv2 create session signalling packet is a CREATE SESSION RESPONSE signalling packet sent by the SGW to the MME, obtaining a second MME end control plane tunnel identifier carried in the CREATE SESSION RESPONSE signalling packet, and matching the second MME end control plane tunnel identifier with the first MME end control plane tunnel identifier stored in the first storage node; and, in response to determining that the matching is successful, obtaining an SGW end control plane tunnel identifier carried in the CREATE SESSION RESPONSE signalling packet, and storing the SGW end control plane tunnel identifier to the first storage node.

4. The method according to claim 3, wherein the storing of the data plane tunnel identifier and the user phone number in the second storage node comprises:
    storing the user phone number in the second storage node;
    in response to determining that the GTPv2 create-modify bearer signalling packet is a MODIFY BEARER REQUEST signalling packet, a MODIFY BEARER RESPONSE signalling packet, a CREATE BEARER REQUEST signalling packet or a CREATE BEARER RESPONSE signalling packet communicated between the MME and the SGW, obtaining the second control plane tunnel identifier carried in the GTPv2 create-modify bearer signalling packet, and matching the second control plane tunnel identifier with the first control plane tunnel identifier stored in the first storage node; and in response to determining that the matching is successful, obtaining the data plane tunnel identifier carried in the GTPv2 create-modify bearer signalling packet, and storing the data plane tunnel identifier in the second storage node.

5. The method according to claim 3, further comprising:
in response to determining that the matching of the second MME end control plane tunnel identifier with the first MME end control plane tunnel identifier stored in the first storage node is successful, obtaining IP address information carried in the CREATE SESSION RESPONSE signalling packet, and storing the IP address information in the second storage node.

6. The method according to claim 1, wherein the distributing of the data packet based on the target user phone number comprises:
labelling the target user phone number in the data packet; and
distributing the data packet based on the target user phone number labelled in the data packet.

7. The method according to claim 6, wherein the distribution device comprises a plurality of egress ports, and correspondence between a plurality of preset user phone numbers and the plurality of egress ports, respectively, is maintained in the distribution device; and
the distributing of the data packet based on the target user phone number labelled in the data packet comprises: determining, based on the correspondence, one of the plurality of egress ports corresponding to the target user phone number labelled in the data packet; and forwarding the data packet via the determined egress port.

8. A distribution device for flow on a 4G network, the distribution device comprises:
a processor; and
a memory storing a computer program that can be executed by the processor to perform operations comprising:
monitoring a GTPv2 signalling packet communicated between a mobile management entity (MME) and a serving gateway (SGW);
obtaining a data plane tunnel identifier and a user phone number, which are carried in the monitored GTPv2 signalling packet and indicate a same user equipment (UE), and establishing association relationship between the data plane tunnel identifier and the user phone number;
obtaining a target data plane tunnel identifier carried in a received data packet; and
determining a target user phone number associated with the target data plane tunnel identifier based on the association relationship, and distributing the data packet based on the target user phone number;
wherein:
the obtaining of the data plane tunnel identifier and the user phone number and the establishing of the association relationship comprise:

obtaining a first control plane tunnel identifier and the user phone number, which are carried in a monitored GTPv2 create session signalling packet;
obtaining a second control plane tunnel identifier carried in a monitored GTPv2 create-modify bearer signalling packet;
matching the second control plane tunnel identifier with the first control plane tunnel identifier; and
in response to determining that the matching is successful, obtaining the data plane tunnel identifier carried in the GTPv2 create-modify bearer signalling packet, and establishing the association relationship between the data plane tunnel identifier and the user phone number;
the distribution device further comprises a first storage node and a second storage node associated with the first storage node;
the obtaining of the first control plane tunnel identifier and the user phone number comprises: storing the first control plane tunnel identifier in the first storage node;
the obtaining of the data plane tunnel identifier carried in the GTPv2 create-modify bearer signalling packet comprises: storing the data plane tunnel identifier and the user phone number in the second storage node; and
the establishing of the association relationship between the data plane tunnel identifier and the user phone number comprises: establishing the association relationship between the data plane tunnel identifier and the user phone number in the second storage node.

9. The distribution device according to claim 8, wherein the first storage node and the second storage node store a same user phone number or a same control plane tunnel identifier.

10. The distribution device according to claim 8, wherein the storing of the first control plane tunnel identifier in the first storage node comprises one of:
in response to determining that the GTPv2 create session signalling packet is a CREATE SESSION REQUEST signalling packet sent by the MME to the SGW, obtaining a first MME end control plane tunnel identifier and the user phone number, which are carried in the CREATE SESSION REQUEST signalling packet, and storing the first MME end control plane tunnel identifier to the first storage node; and
in response to determining that the GTPv2 create session signalling packet is a CREATE SESSION RESPONSE signalling packet sent by the SGW to the MME, obtaining a second MME end control plane tunnel identifier carried in the CREATE SESSION RESPONSE signalling packet, and matching the second MME end control plane tunnel identifier with the first MME end control plane tunnel identifier stored in the first storage node; and, in response to determining that the matching is successful, obtaining an SGW end control plane tunnel identifier carried in the CREATE SESSION RESPONSE signalling packet, and storing the SGW end control plane tunnel identifier to the first storage node.

11. The distribution device according to claim 10, wherein the storing of the data plane tunnel identifier and the user phone number in the second storage node comprises:
storing the user phone number in the second storage node;
in response to determining that the GTPv2 create-modify bearer signalling packet is a MODIFY BEARER REQUEST signalling packet, a MODIFY BEARER RESPONSE signalling packet, a CREATE BEARER REQUEST signalling packet or a CREATE BEARER RESPONSE signalling packet communicated between the MME and the SGW, obtaining the second control plane tunnel identifier carried in the GTPv2 create-modify bearer signalling packet, and matching the second control plane tunnel identifier with the first control plane tunnel identifier stored in the first storage node; and in response to determining that the matching is successful, obtaining the data plane tunnel identifier carried in the GTPv2 create-modify bearer signalling packet, and storing the data plane tunnel identifier in the second storage node.

12. The distribution device according to claim 10, wherein the operations further comprise:

in response to determining that the matching of the second MME end control plane tunnel identifier with the first MME end control plane tunnel identifier stored in the first storage node is successful, obtaining IP address information carried in the CREATE SESSION RESPONSE signalling packet, and storing the IP address information in the second storage node.

13. The distribution device according to claim 8, wherein the distributing of the data packet based on the target user phone number comprises:

labelling the target user phone number in the data packet; and distributing the data packet based on the target user phone number labelled in the data packet.

14. The distribution device according to claim 13, further comprising a plurality of egress ports, wherein correspondence between a plurality of preset user phone numbers and the plurality of egress ports, respectively, is maintained in the distribution device; and the distributing of the data packet based on the target user phone number labelled in the data packet comprises: determining, based on the correspondence, one of the plurality of egress ports corresponding to the target user phone number labelled in the data packet; and forwarding the data packet via the determined egress port.

* * * * *